United States Patent
Moni et al.

(10) Patent No.: US 7,177,356 B2
(45) Date of Patent: Feb. 13, 2007

(54) SPATIALLY TRANSCODING A VIDEO STREAM

(75) Inventors: Shankar Moni, San Jose, CA (US); John Tardif, San Jose, CA (US)

(73) Assignee: WebTV Networks, Inc., Mountain View, CA (US)

( * ) Notice: Subject to any disclaimer, the term of this patent is extended or adjusted under 35 U.S.C. 154(b) by 884 days.

(21) Appl. No.: 10/044,207

(22) Filed: Jan. 11, 2002

(65) Prior Publication Data

US 2003/0133512 A1    Jul. 17, 2003

(51) Int. Cl.
*H04B 1/66*    (2006.01)
(52) U.S. Cl. .......................... 375/240.01; 375/240.12; 375/240.18
(58) Field of Classification Search ................ 375/246, 375/240.12, 240.16
See application file for complete search history.

(56) References Cited

U.S. PATENT DOCUMENTS 6,005,623 A * 12/1999 Takahashi et al. ..... 375/240.16
6,141,447 A * 10/2000 Linzer et al. ............... 382/236
6,519,283 B1 * 2/2003 Cheney et al. ......... 375/240.01
6,577,679 B1 * 6/2003 Apostolopoulos ...... 375/240.12
6,647,061 B1 * 11/2003 Panusopone et al. .. 375/240.12
6,671,322 B2 * 12/2003 Vetro et al. ............ 375/240.16
2001/0047517 A1 * 11/2001 Christopoulos et al. ....... 725/87

OTHER PUBLICATIONS

Wee et al. Secure Scalable Streaming Enabling Transcoding Without Decryption. IEEE International Conference on Image Processing. Oct. 2001.*
Information technology—Generic coding of moving pictures and associated audio information: Video; *International Standard*; ISO/IEC 13818-2; First Edition; 1996; 202 pgs.

* cited by examiner

Primary Examiner—Temesghen Ghebretinsae
Assistant Examiner—Juan Alberto Torres
(74) Attorney, Agent, or Firm—Workman Nydegger

(57) ABSTRACT

Systems and methods for transcoding a video stream. An incoming video stream is spatially transcoded to reduce the bit rate of the video stream. The incoming video stream is decoded and the stream parameters are saved for use in generating the output video stream. The decoded video stream is resampled and the images are spatially reduced. Using the stream parameters of the incoming video stream, an outgoing video stream is generated. Some of the stream parameters are unchanged while others are re-computed for the outgoing video stream.

58 Claims, 5 Drawing Sheets

SPATIALLY TRANSCODING A VIDEO STREAM

BACKGROUND OF THE INVENTION

1. The Field of the Invention

The present invention relates to reducing an image size and/or a bit rate of a video stream. More particularly, the present invention relates to reducing a bit rate of a video stream by spatially transcoding the video stream.

2. Background and Relevant Art

Digital video signals have several significant advantages over their analog counterparts. They can be transmitted, for example, over long distances and stored without degradation. One cost, however, of digital signals is related to the bandwidth that they consume. The raw storage requirement for a typical uncompressed video stream, depending on the resolution, is approximately 20 megabytes per second. At this rate, an uncompressed two hour movie would require 144 Gigabytes of memory, well above the capacity of a conventional Digital Versatile Disk (DVD).

Clearly, uncompressed digital or video signals can consume significant bandwidth. This is particularly a problem in situations where multiple digital signals are being broadcast or where the digital signal is being transmitted over a medium such as the Internet, which has limited bandwidth in many circumstances. The need to reduce bandwidth requirements of digital signals such as video streams has led to the development of various compression schemes.

One conventional compression scheme or standard defined by the Moving Pictures Expert Group (MPEG) is called MPEG-2. MPEG-2 is based on the principle that there is a large degree of visual redundancy in video streams and that video storage and bandwidth requirements can be reduced by removing the redundant information from the video stream.

The bit stream defined by MPEG is the output of an encoding process that is designed to significantly compress the video picture information. As the MPEG standard only defines the syntax of the resulting bit stream, the standard is flexible enough to be used in a variety of different situations, such as satellite broadcast services, cable television, interactive television services, and the Internet.

The MPEG encoding process generally occurs as follows. A video signal is sampled and quantized to define color and luminance components for each pixel of the digital video. Values representing the color and luminance components are stored in structures known as macroblocks. The color and luminance values stored in the macroblocks are converted to frequency values using a discrete cosine transform (DCT). The transform coefficients obtained from the DCT represent different frequencies in the brightness and the color of the picture.

The MPEG encoding process takes advantage of the fact that human visual system is insensitive to high frequencies in color and luminance changes, and quantizes the transform coefficients to represent the color and luminance information by smaller or more coarsely scaled values. The quantized DCT transform coefficients are then encoded using run level coding (RLC) and variable length coding (VLC) techniques, which further compress the video stream.

The MPEG standard also provides additional compression through motion compensation techniques. Under the MPEG standards, there are three types of pictures or frames: I frames; P frames; and B frames. The I frames are intra-coded, meaning that they can be reconstructed without reference to any other frame or picture in the video stream. P frames and B frames are inter-coded, meaning that they are reconstructed by referencing another frame or picture. For example, P frames and B frames contain motion vectors that represent estimated motion with respect to the reference frame(s). The use of motion vectors enables an MPEG encoder to reduce the bandwidth requirements of a particular video stream.

However, even compressed video or MPEG streams may still have a bit rate that is unsatisfactorily high for certain applications, and therefore there is a need to further compress the video stream or reduce the bit rate of the stream. One solution to this problem is to reduce the bit rate of the MPEG stream by completely decoding the MPEG stream and then re-encoding the MPEG stream at a higher compression ratio to reduce the bit rate to an acceptable level. However, decoding and re-encoding an MPEG stream in this fashion is often computationally expensive because of the need to perform an inverse quantization and an inverse DCT to recreate an approximation of the original data prior to re-encoding the data in accordance with a desired bit rate. There is also a need to recompute motion vectors and other parameters that are included in the resulting bit stream.

As previously stated however, decoding and re-encoding a video stream is often necessary because the bit rate of the incoming video stream may be higher than the available bandwidth or the bit rate of the incoming video stream may be higher than the optimal bit rate for storage of the video stream on a storage medium such as a hard disk drive. In view of these and other problems presented by video streams, minimally complex systems and methods are needed that can reduce the storage and bandwidth requirements of a video stream.

SUMMARY OF THE INVENTION

The present invention recognizes the limitations of the prior art and the need for systems, methods, and computer program products that are able to reduce the bit rate of a video stream. Reducing the bit rate of a video stream provides significant advantages such as reducing bandwidth and storage requirements of a video stream, enabling the viewing of high definition video streams on a standard definition device, and allowing users to store or render video streams at bit rates and image sizes that are determined by the user.

Reducing the bit rate of a video stream begins by decoding the video stream. After the video stream has been decoded, each image of the video stream is resized or spatially reduced horizontally and vertically by a factor. The horizontal and vertical scaling factors may be different. After the images have been resized, the outgoing video stream is generated. Instead of re-encoding the video stream from the decoded video stream, the present invention utilizes parameters that were part of or that described the original incoming video stream. These parameters represent decisions made by a previous encoder that more accurately reflect the video stream. The video stream generator thus utilizes these parameters as the new video stream is generated instead of generating the parameters strictly from the decoded video stream.

In some instances, some of these parameters from the original video stream are unchanged in the transcoded video stream while other parameters of the transcoded video stream are re-computed. Re-computing a particular parameter is often necessary, for instance, because the spatial size of the images has changed. Motion vectors, in particular, are re-computed to account for the changed image size. Other macroblock parameters are also re-computed using a variety of procedures that take the parameter values of the original video stream into account. This results in a video stream that is representative of the sequenced reduced images, has a reduced bit rate, retains improved visual quality, and whose generation is computationally efficient.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

An uncompressed digital video stream has high bandwidth and storage requirements. Video streams are encoded in order to reduce the number of bits that must be transmitted and thus reduce the bandwidth and storage requirements of the video stream. In some situations, however, it is necessary to further reduce the number of bits in a video stream for various reasons, including bandwidth restrictions and storage concerns.

The present invention relates to transcoding a video stream such as a Moving Pictures Experts Group (MPEG) stream. More specifically, the present invention relates to spatial transcoding where the outgoing video stream that has been generated from the incoming video stream has images that are spatially smaller than the images in the original video stream.

Video streams received over satellite systems, cable systems, and the Internet, for example, have already been encoded. In some situations, a high quality encoder was utilized to generate the video stream. The parameters of the video stream (motion type, width, height, picture rate, bit rate, etc.) represent decisions that are made by the encoder and are used as the video stream is transcoded.

As previously mentioned, transcoding a video stream is often performed by fully decoding the original video stream and then re-encoding the video stream. Transcoding a video stream in this fashion ignores the parameters of the original video stream. In other words, the parameters of the new video stream will be regenerated or recomputed without reference to the original parameters. In addition to being computationally expensive, the encoding decisions of the original encoder are therefore not considered as the video stream is re-encoded. In contrast, the present invention generates a new video stream using the parameters or decisions that were made during the previous encoding of the video stream. This ensures that the transcoded video stream more closely approximates the original video stream and yields a substantially smaller implementation size.

An exemplary use of the present invention is the ability to view a high definition video stream on a standard definition device. A high definition video stream, in addition to having a relatively high bit rate, contains images that cannot be shown on a standard definition device for various reasons, including image size. The present invention is able to spatially reduce the size of the images and reduce the bit rate of the video stream, thus enabling a standard definition device to display a video stream that was originally a high definition video stream.

Figure 1:
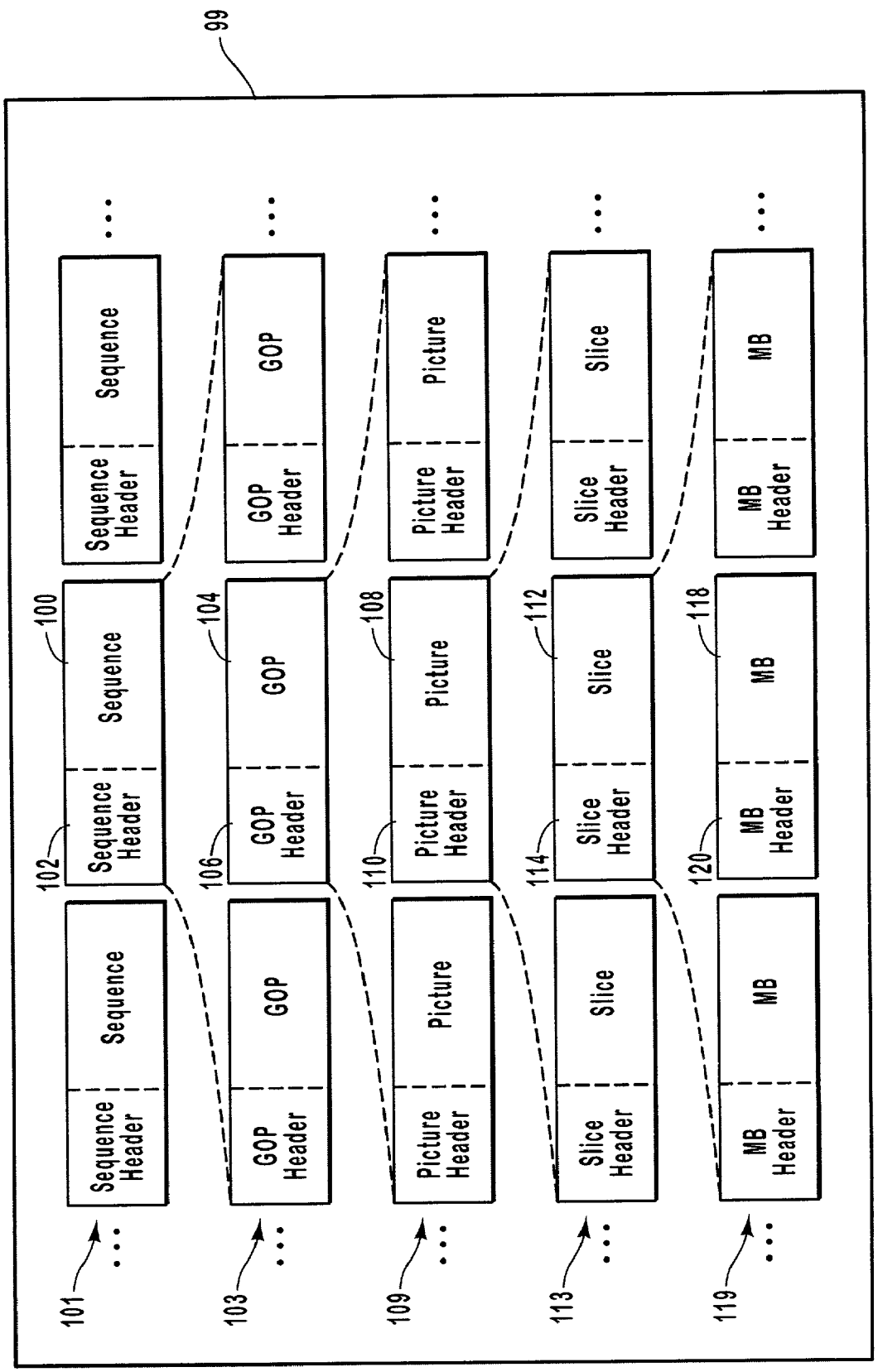
FIG. 1 illustrates exemplary levels of a typical video stream and the headers of those levels, wherein the headers contain stream parameters.

FIG. 1 describes an exemplary video stream that has been encoded. FIG. 1 also introduces some of the parameters that are included in an encoded video stream. These parameters often represent decisions made by the previous encoder during the encoding process. FIG. 1 is not intended as an exhaustive explanation of a video stream and it is further understood that the principles described herein can be applied more broadly to other parameters of the video stream.

In this example, the video stream of FIG. 1 illustrates a nested hierarchy of different levels of a video stream 99 (not all levels of a video stream are illustrated) that includes sequences, groups of pictures, pictures, slices, and macroblocks. Each subsequent level in the video stream is part of a previous layer or level. Thus the sequence level 101 is a series of sequences and each sequence contains or more groups of pictures (GOP). The group of picture (GOP) level 103 is a series of groups of pictures and each GOP includes one or more pictures. The picture level 109 is a series of pictures (including I frames, P frames, and/or B frames) and each picture includes one or more slices The slice level 113 is a series of slices and each slice contains one or more macroblocks. The macroblock (MB) level 119 is a series of macroblocks.

In order to decode the video stream 99, it is necessary to have certain information about the video stream 99. Often, this information is included in headers that are included in the video stream. Thus, each block of data at each level of the video stream usually has a header that contains relevant information that is related to the encoding and decoding of the video stream. The sequence 100, for example has a sequence header 102. The GOP 104 has a GOP header 106, the picture 108 has a picture header 110, the slice 112 has a slice header 114, and the MB 118 has a MB header 120.

The sequence header 102 includes parameters that describe, for example, the width of pictures, the height of pictures, the aspect ratio of pixels, the picture rate, and the like. The sequence header 102 also includes parameters for the bit rate, the buffer size, and other flags. The sequence header 102 is also used to transmit the quantizer matrices for intra blocks and non intra blocks, for example.

The GOP header 106 includes parameters that relate to a time code and other parameters that describe the structure of the GOP. The picture header 110 includes parameters that describe the type of frame or picture (I frame, P frame, and B frame in MPEG), for example. The picture parameters also include buffer parameters that indicate when decoding should begin and encode parameters that indicate whether half pixel motion vectors were used. The slice header 114 includes parameters to indicate which line the slice starts on and a quantizer scale indicating how the quantization table should be scaled for a particular slice. The MB header 120 indicates whether the MB 118 includes motion vectors as well as the type of motion vector (forward, backwards), type of macroblock, a quantization scale, and the like. The MB header 120 also determines discrete cosine transform (DCT) type, DCT coefficients, coded block pattern, and associated flags.

Figure 2:
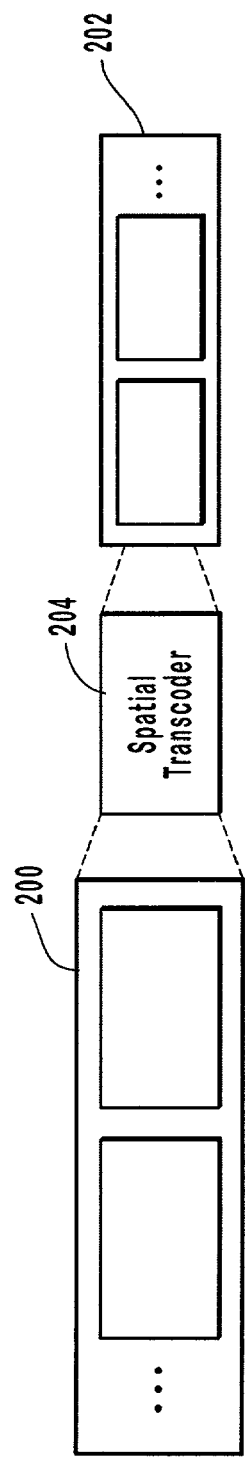
FIG. 2 is a block diagram illustrating a spatial transcoder that receives an incoming video stream and transcodes the incoming video stream to generate a spatially reduced video stream.

FIG. 2 is a block diagram illustrating the functionality of the present invention. An incoming video stream 200 is received by a spatial transcoder 204. The spatial transcoder 204 decodes the incoming video stream 200 and resamples the video stream 200. From the resampled data and using parameters or cues from the incoming video stream 200, an outgoing video stream 202 is generated.

The outgoing video stream 202 is spatially smaller because the images have been reduced in size. The outgoing video stream 202 also has a reduced bit rate compared to the incoming video stream 200. The spatial transcoder 204 does not, however, perform a full decode and a complete re-encoding of the video stream. The spatial transcoder 204 utilizes the decisions of the encoder that encoded the incoming video stream 200 in generating the outgoing video stream 202. The spatial transcoder 204 thus generates a video stream that corresponds to a reduced size image sequence that often results in a substantial bit rate reduction.

Figure 3:
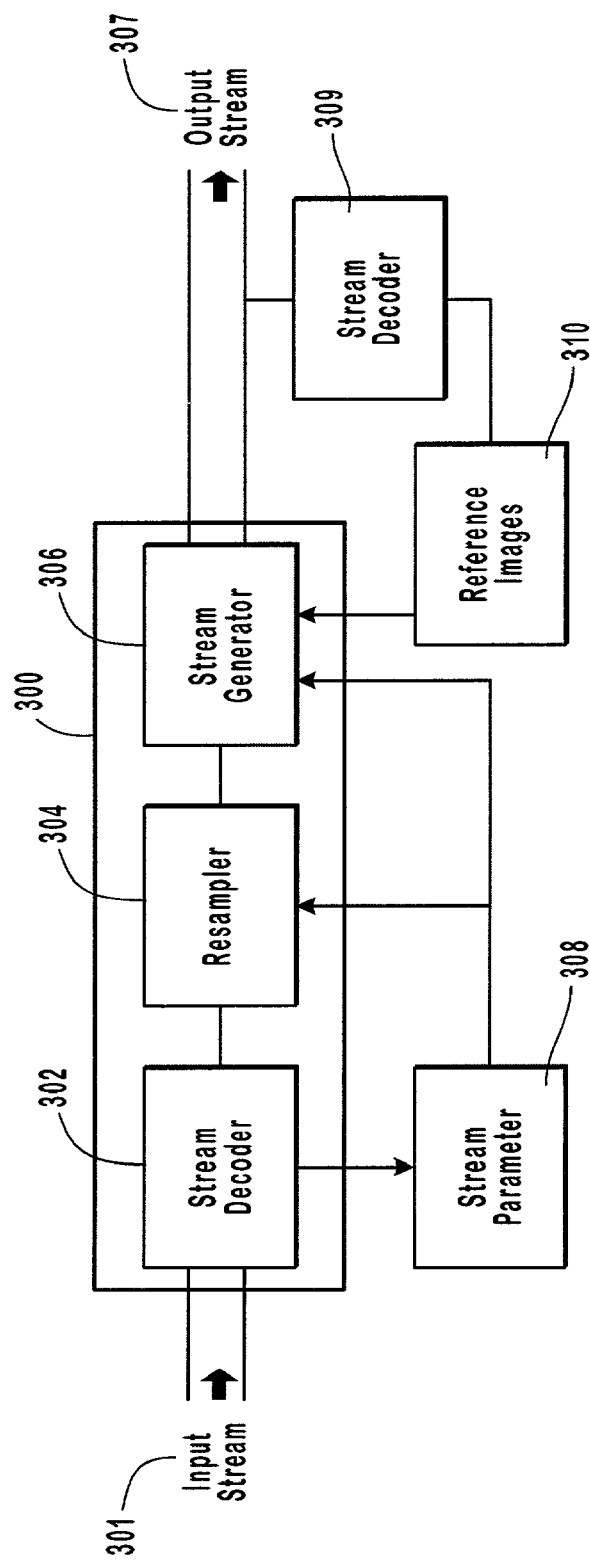
FIG. 3 is a more detailed block diagram of a spatial transcoder and illustrates how stream parameters are used to generate a new video stream.

FIG. 3 is a block diagram that more fully illustrates the spatial transcoder of FIG. 2. The input video stream 301 is received by a stream decoder 302, which decodes the video stream. Typically, the stream decoder 302 fully decodes the input video stream 301. The stream parameters 308 from the input video stream are extracted and saved for later use by the spatial transcoder 300 in generating the transcoded video stream. The stream parameters 308, as previously described, correspond to decisions of the encoder that encoded the input video stream 301. The spatial transcoder 300, by using these stream parameters in generating the output stream 307, is able to preserve those decisions, which often helps retain visual quality of the output video stream 307.

The video stream is then resampled by the resampler 304 in order to reduce the image size. After the images in the video stream have been spatially reduced, the stream generator 306 generates the output video stream 307. It is not necessary for all images to be spatially reduced before the stream generator 306 begins generating the output video stream 307. As previously stated, the resampler 304 and the stream generator 306 utilize the stream parameters 308 from the input stream 301. To fully generate the output video stream 307, especially B frames and P frames, reference images 310 are made available to the stream generator 306 by a stream decoder 309, which decodes images from the output video stream 307.

At the sequence level, GOP level, and picture level of the video stream, some of the parameters of the input video stream 301 may be altered. However, any change made to the parameters usually uses the original parameters as a reference for altering the parameters. In other words, the parameters of the output video stream 307 are related to the stream parameters 308 and are not strictly derived from the decoded video stream.

At the sequence level, for example, a new picture size is computed as the output stream 307 has been spatially reduced by the spatial transcoder 300. Although the horizontal and vertical re-sampling factors used by the resampler 304 are already known by the spatial transcoder 300, it is useful to ensure that the height and width of the images in the output video stream are multiples of 32 and 16 respectively.

At the picture level of the video stream, there is an f_code parameter included in the picture level header. The f_codes determine the granularity at which the motion vectors are encoded. This has a direct effect on the number of bits that are used to encode the residue of the motion vectors. The maximum motion vector of the picture determines the optimal or smallest f_code that can be used. In one example, the f_codes are scaled as they are decoded. In another example, the f_codes are determined at the end of decoding the original picture.

At the macroblock level of the video stream, there are several macroblock parameters than need to be determined. These include, but are not limited to, macroblock type, motion vectors and associated flags, DCT type, quantizer scale, coded block pattern, and DCT coefficients. The following paragraphs illustrate how these parameters may be determined by the spatial transcoder 300 or by the stream generator 306.

I. Macroblock Type

Figures 4, 5A, 5B:
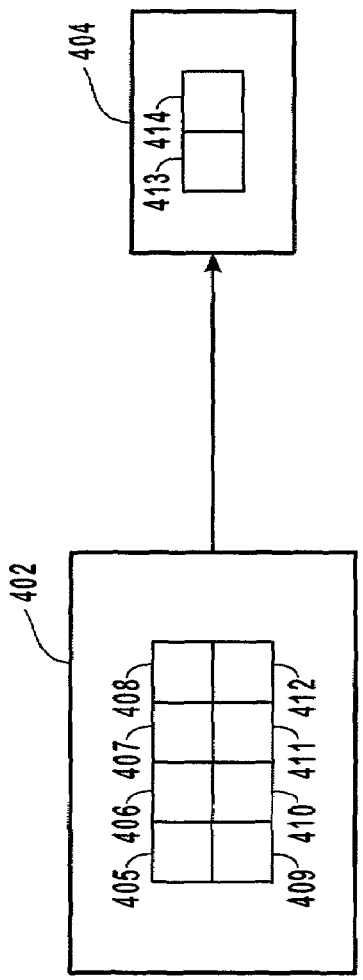
FIG. 4 is a block diagram that illustrates an example of how macroblocks of the incoming video stream are mapped to the outgoing video stream such that parameters of the new macroblocks can be generated from the parameters of the original macroblocks.
FIG. 5A is a block diagram illustrating a raster scan ordering of pixels.
FIG. 5B illustrates the order in which the pixels of FIG. 5A were selected for subsampled sum of absolute differences.

FIG. 4 illustrates a pair of pictures or frames. The picture 402 is present in the original video stream and the picture 404 is the transcoded version of the picture 402. As illustrated, the picture 404 has been spatially reduced in comparison to picture 402. The pictures 402, and 404 can correspond to various types of pictures, for example an I frame, a B frame or a P frame.

The picture 402 of FIG. 4 illustrates various macroblocks numbered as macroblock 405 through macroblock 412. As the picture 402 is transcoded, one or more of the macroblocks of the picture 402 are mapped or correspond to a macroblock of the picture 404. If the horizontal and/or vertical factors by which the picture 402 is scaled are not an integer value, it is possible that a partial macroblock in the picture 402 will be mapped to a macroblock of the picture 404. In this example, the macroblocks 405, 406, 409, and 410 map or correspond to the macroblock 413 while the macroblocks 407, 408, 411, and 412 map or correspond to the macroblock 414.

After the macroblocks of picture 402 have been mapped to the picture 404, the macroblock type for the macroblocks 413 and 414 is ascertained. It is necessary to determine whether the macroblocks 413 and 414 are intra macroblocks or non-intra macroblocks. This can be determined using the parameters of the original video stream. More specifically, the macroblock types of the original picture are used to determine the macroblock types of the new or transcoded video stream.

In other words, whether the macroblock 413 is an intra or a non-intra macroblock can be determined by applying a weighted mean rounded measure to the macroblocks 405, 406, 409, and 410. For example, each macroblock has a flag that identifies the macroblock type as either intra or non-intra. A 1 represents an intra macroblock type and a 0 represents a non-intra macroblock type. The weighted mean rounded measure is determined as follows. If the macroblocks 405, 406, and 409 have a 1 for their macroblock type flag while the macroblock 410 has a 0 for that flag, then the weighted mean rounded measure for these macroblocks is 1 (round ((1+1+1+0)/4)). Thus, the macroblock 413 in the picture 404 is an intra type macroblock. For those situations where a partial macroblock of the picture 402 is being mapped, then the value of the flag used for these purposes will be weighted accordingly and be between 0 and 1. For example, if half of a macroblock is mapped to a particular macroblock then that macroblock contributes a value of 0.5 to the weighted mean rounded measure.

Determining the macroblock type also requires that other flags including, but not limited to, quant flag, forward flag, backward flag, and pattern flag, be determined. The quant flag indicates whether the quantizer scale of the current macroblock is different from the value currently being used in the decoder and is determined in a similar manner. The pattern flag is also determined in a similar manner. The forward and backward flags indicate whether or not forward and/or backward motion vectors are present in the macroblock of the picture 404. These flags will be discussed more fully in the next section on motion vector selection.

II. Selection of Motion Vectors and Associated Flags

Motion vectors, in one example, are stored in a 2×2×2 array. The first dimension of the array is associated with top and bottom fields of a picture, the second dimension of the array relates to forward and backward motion, and the third dimension of the array relates to X and Y vectors. Motion vectors are used to obtain data from a reference frame and more specifically identify the location in the reference frame where the data is located.

FIG. 4 may also be used to illustrate how to determine motion vectors and associated flags. The motion vectors for the macroblock 413 can be determined using a weighted mean scaled value. Alternatively, the motion type is set to frame motion and the new motion vectors are determined according to how the macroblocks in the picture 402 contributed to the macroblocks in the picture 404. The resulting X and Y values are scaled according to how the picture 404 is scaled or shrunk. After the motion vectors have been determined, a clipping function is employed to ensure that the motion vectors are within appropriate limits.

In another example, the scaled motion vectors of the original macroblocks are used as candidate vectors along with the weighted mean scaled vector. Each of these vectors is evaluated to determine which vector provides a best fit to the data of the resulting video stream. The best fit to the data can be determined, for example, using a goodness of fit measure.

One example of a goodness of fit measure or metric is a subsampled sum of absolute differences (SAD) as a metric as illustrated in FIGS. 5A and 5B. FIG. 5A refers to an original raster scan ordering of pixels from a block. The sequence of numbers in FIG. 5B corresponds to a dyadically subdivided selection of the zig zag scan order. Thus, the $0^{th}$ pixel selected was the $28^{th}$ in raster scan order and the $31^{st}$ pixel selected was the $0^{th}$ in raster scan order. This scan order attempts to get a representation of the entire block. Thus, for a SAD measure, only the pixels in the first row of FIG. 5B are used. Alternatively, it is possible to do a subsampled SAD in raster scan order as shown in FIG. 5A. The SAD is an example of generating a metric or score that indicates how well a prediction matches the data that is being predicted.

The selection of the motion vectors may also be related to field motion. In one example, the motion can be either frame or field motion, depending on which provides a better fit to the data. The motion vectors are then determined using a weighted mean scaled approach as described above and various settings are evaluated to determine the best fit to the data. Exemplary settings include using field motion plus one of four different settings of the motion vertical field select. Another setting is the frame motion setting.

Fine grain motion estimation may also be performed by evaluating motion vectors in a small search range around, for example, the motion vectors discussed above (weighted means scaled motion vectors, original scaled motion vectors, and field vectors). As the size of the search range is increased, the bit rate of the video stream is typically reduced. However, there may be an increase in the computational and memory requirements related to the increased search range. In another example, it is possible to search for motion vectors independent of previous motion vectors and then compare the newly found motion vectors with the motion vectors obtained as discussed above.

The DCT type flag is a binary value and can be determined per macroblock using the weighted mean rounded procedure previously described for the intra flag. The quantizer scale can be determined using various procedures. The quantizer scale, however, is not limited to values of 0 and 1 like a binary flag. The quantizer scale, therefore, can be determined using various procedures including, but not limited to, the weighted mean rounded procedure, a weighted max rounded procedure, weighted min rounded procedure, a weighted median rounded procedure, and the like. The quantizer scale may be further adjusted according to any rate control mechanism used for the video stream.

The following equations are examples for computing the weighted mean rounded procedure, the weighted max rounded procedure, the weighted min rounded procedure, and the weighted median rounded procedure, given inputs $x_i$ and non-negative weights $w_i$.

The weighted mean rounded procedure is computed as: Weighted mean rounded=round $((\Sigma_i w_i x_i)/(\Sigma_i w_i))$. The weighted min rounded procedure is computed, where $i_{min}$=arg $\min_i (w_i/x_i)$, as: Weighted min rounded=round $(x_{i_{min}})$. The weighted max rounded procedure is computed, where $i_{max}$=arg $\max_i (w_i x_i)$, as: Weighted max rounded=round $(x_{i_{max}})$.

The weighted median rounded procedure is computed as follows: In this procedure, where h is the highest common factor of the weights $w_i$ (thus $w_i = n_i h$, where $n_i$ is an integer), $(v_k)$=a collection of $x_i$, with each $x_i$ written $n_i$ times, $k_{median}$=arg median$_k$ $(v_k)$, and $i_{median}$=index corresponding to $k_{median}$, weighted median round=round $(x_{i_{median}})$.

Figure 6:
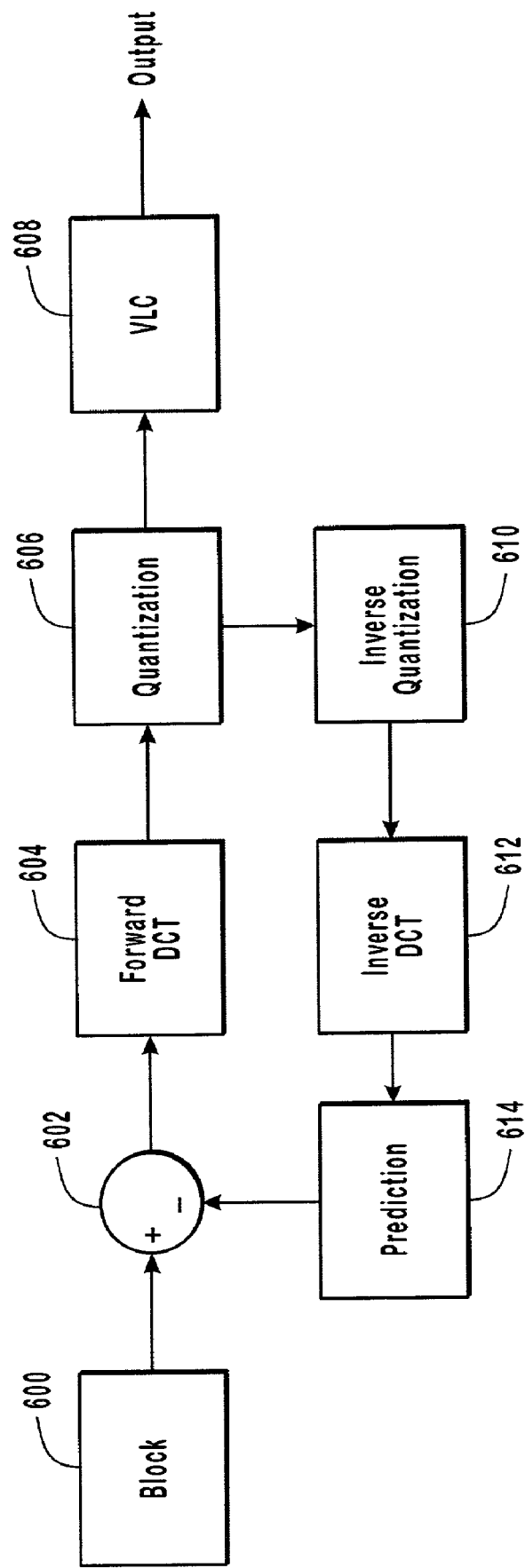
FIG. 6 is a block diagram illustrating how Discrete Cosine Transfer coefficients are generated by a stream generator.

The coded block pattern is dependent on the quantization of the DCT coefficients and is computed in a routine manner. The DOT coefficients are computed as illustrated in FIG. 6 When a block 600 is a non-intra block, the motion vectors are used to determine the prediction 614 from the reference frames. The prediction 614 is subtracted (602) from the block 600 and a forward PCT 604 is performed on the output. The output is quantized (606) and variable length coded (608) and written as an output bit stream. In the case of I and P frames, inverse quantization 610 and inverse DCT 612 are performed on the output of the quantization process (606) and the prediction 614 is added (602) to new frames as described. Intra blocks do not require prediction and can be quantized without reference to other blocks.

The flags associated with a macroblock, as previously indicated, include a macroblock type flag, a DCT type flag, and a motion type flag. The macroblock flag has 5 bits. Two of these bits are derived from the current state of the transcoder and the remaining flags are determined, in this example, as follows.

Let $a_i$ represents the contribution of macroblocks from the original video stream to the current macroblock of the new video stream. Let $Intra_i$ be a variable that has a value of 1 for intra blocks and a value of 0 for non-intra blocks. Let $Forward_i$ be a variable that has a value of 1 for macroblocks with the "Forward" flag set and a value of 0 otherwise. Let $Backward_i$ be a variable that has a value of 1 for macroblocks with the "Backward" flag set and a value of 0 otherwise. If $((\Sigma_i\, a_i) \geq 0.5)$, then the current macroblock is an intra macroblock.

Otherwise, the following steps are taken. Let the Forward flag have a value of 1 if $((\Sigma_i\, a_i\, Forward_i) \geq 0.5)$, and have a value of 0 otherwise. If the current macroblock is a B frame, then let the Backward flag have a value of 1 if $((\Sigma_i\, a_i\, Backward_i) \geq 0.5)$, and have a value of 0 otherwise. If the current macroblock is a P frame, then the Backward flag is given a value of 0. This example illustrates how to determine the Intra, Forward, and Backward flags for the macroblock type. The remaining flags (quant and pattern) are derived from the quantization scale and the DCT coefficients.

The DCT type for the new macroblock of the new video stream is determined from the DCT $type_i$ of the contributing macroblocks of the original video stream as follows. If $((\Sigma_i\, a_i\, DCT\, type_i) \geq 0.5)$, then the DCT type of the current macroblock is given a value of 1 and a value of 0 otherwise.

The motion type may be similarly determined where if $((\Sigma_i\, a_i\, Motion\, type_i) \geq 0.5)$, then the motion type is assigned a value of 1 and a value of 0 otherwise. If fine grained motion estimation is used to determine the motion type, then the motion type and the motion vector are selected based on whether the lowest score comes from the field motion or the frame motion.

The present invention extends to both methods and systems for transcoding a video stream. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 7:
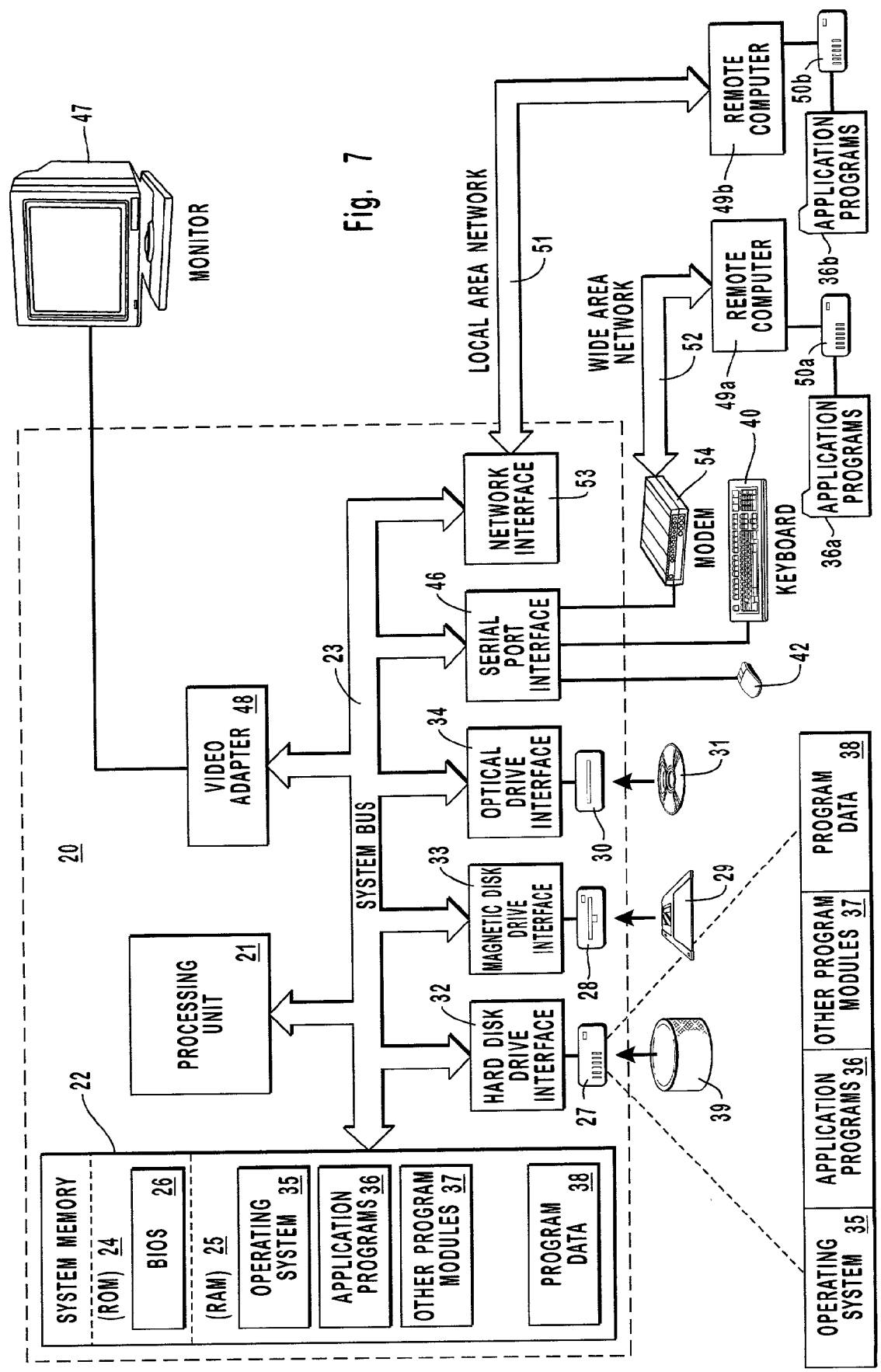
FIG. 7 is a block diagram illustrating a suitable operating environment for the present invention.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system where an incoming video stream has a bit rate, a method for transcoding the incoming video stream to reduce the bit rate of the video stream, the method comprising:
    decoding an incoming video stream that includes at least one B frame and a plurality of macroblocks, each macroblock having parameters that include at least a type flag indicating whether the macroblock is intra or non-intra and, for each non-intra macroblock, one or more motion vectors, wherein the parameters of the incoming video stream are extracted from the incoming video stream and used in generating a new video stream;
    spatially reducing a size of images of the incoming video stream horizontally and vertically by a selected factor, and such that the at least one B frame is considered during the spatially reducing images;
    mapping each of the plurality of macroblocks to at least one macroblock in the new video stream;
    determining a macroblock type for each macroblock of the new video stream, wherein the macroblock type is determined by applying a weighted mean rounded value determined from the type flags of only the macroblocks of the incoming video stream that map to a particular macroblock of the new video stream; and
    generating the new video stream that includes spatially reduced images using one or more of the parameters extracted from the incoming video stream, and at least the macroblock type of macroblocks of the new video stream, wherein at least one of the parameters corresponds to the at least one B frame, wherein less than all of the parameters of the incoming video stream are re-computed for the new video stream, and wherein the spatially reduced images in the new video stream include at least one B frame.

2. A method as defined in claim 1, wherein spatially reducing images of the incoming video stream by a selected factor further comprises re-sampling the incoming video stream after it has been decoded.

3. A method as defined in claim 1, wherein generating a new video stream further comprises at least one of:
    scaling f_codes of the incoming video stream as the f_codes is decoded; and
    scaling f_codes of the incoming video stream after decoding an entire picture of the video stream.

4. A method as defined in claim 1, wherein determining a macroblock type for each macroblock comprises:
    determining a macroblock type for each macroblock of the incoming video stream that maps to a particular macroblock of the new video stream, wherein the macroblock type of the macroblocks from the incoming video stream are included in the parameters of the incoming video stream;
    determining that at least one macroblock of the incoming video stream maps to each of a plurality of macroblocks of the new video stream;
    weighting each macroblock type of the macroblocks in the incoming video stream according to their contribution to the particular macroblock of the new video stream;
    taking a mean of the weighted macroblock types from the incoming video stream; and
    rounding the mean, wherein the rounded mean determines the macroblock type for the particular macroblock of the new video stream.

5. A method as defined in claim 4, further comprising determining other flags associated with the macroblock type.

6. A method as defined in claim 5, wherein the flags comprise a quant flag, a forward flag, a backward flag, and a pattern flag.

7. A method as defined in claim 1, wherein generating a new video stream further comprises selecting motion vectors for each picture that requires motion vectors.

8. A method as defined in claim 7, wherein selecting motion vectors further comprises determining a value of the motion vectors from motion vectors of the incoming video stream.

9. A method as defined in claim 8, wherein determining a value of the motion vectors from motion vectors of the incoming video stream further comprises determining a weighted mean scaled value of the motion vectors from motion vectors of the incoming video stream that map to a particular macroblock of the new video stream.

10. A method as defined in claim 7, wherein selecting motion vectors further comprises:
   selecting candidate motion vectors for a particular macroblock of the new video stream, wherein the candidate motion vectors comprise scaled motion vectors from the incoming video stream and a weighted mean scaled vector; and
   determining a best motion vector from the candidate motion vectors, wherein the best motion vector provides a best fit to the data.

11. A method as defined in claim 7, further comprising performing fine grain motion estimation for the motion vectors.

12. A method as defined in claim 7, wherein selecting motion vectors comprises one or more of:
   selecting weighted mean scaled motion vectors;
   selecting scaled motion vectors of the incoming video stream; and
   selecting field vectors.

13. A method as defined in claim 1, wherein generating a new video stream further comprises determining flags of the new video stream from flags of the incoming video stream.

14. A method as defined in claim 13, wherein determining flags of the new video stream from flags of the incoming video stream further comprises determining a DCT type flag using a weighted mean rounded procedure.

15. A method as defined in claim 1, wherein generating a new video stream further comprises determining a quantizer scale of the new video stream using a quantizer scale of the incoming video stream.

16. A method as defined in claim 15, wherein determining a quantizer scale of the new video stream using a quantizer scale of the incoming video stream further comprises determining a quantizer scale using one of:
   a weighted mean rounded procedure;
   a weighted max rounded procedure;
   a weighted min rounded procedure; and
   a weighted median rounded procedure.

17. A method as defined in claim 1, further comprising determining a coded block pattern.

18. A method as recited in claim 1, wherein generating a new video stream includes making available one or more reference images for the at least one B frame.

19. A method as recited in claim 1, wherein the new video stream is output having a width which is a multiple of sixteen, and a height which is a multiple of thirty-two.

20. A method for transcoding an original video stream using stream parameters that are included in the original stream video stream such that the bit rate of the original video stream is reduced, the method comprising:
   decoding the original video stream, which includes at least one B frame and a plurality of macroblocks, each macroblock having parameters that include at least a type flag indicating whether the macroblock is intra or non-intra and, for each non-intra macroblock, one or more motion vectors;
   re-sampling the decoded original video stream in order to spatially reduce a size of images of the original video stream horizontally and vertically by a factor, and such that the at least one B frame is considered during re-sampling;
   mapping each of the plurality of macroblocks to at least one macroblock in a new video stream;
   determining new stream parameters for the new video stream, wherein the new stream parameters are determined from the stream parameters of the original video stream, wherein at least one of the stream parameters of the original video stream corresponds to the at least one B frame, wherein only some of the original stream parameters are re-computed, wherein some of the new stream parameters are equal to some of the stream parameters of the original video stream, and wherein determining new stream parameters includes determining a macroblock type for each macroblock of the new video stream, wherein the macroblock type is determined by applying a weighted mean rounded value determined from the type flags of the macroblocks of the incoming video stream that map to a particular macroblock of the new video stream; and
   generating the new video stream that includes the spatially reduced images using the new stream parameters, wherein the spatially reduced images in the new video stream include at least one B frame.

21. A method as defined in claim 20, wherein generating the new video stream comprises at least one of:
   scaling f_codes of the original video stream as the f_codes are decoded; and
   scaling f_codes of the original video stream after decoding an entire picture of the original video stream.

22. A method as defined in claim 20, wherein generating the new video stream further comprises determining flags for the new video stream using flags of the original video stream.

23. A method as defined in claim 20, wherein determining a macroblock type for each macroblock of the new video stream comprises:
   determining a macroblock type for each macroblock of the original video stream that maps to a particular macroblock of the new video stream, wherein the macroblock type of the macroblocks from the original video stream are retrieved from the stream parameters of the original video stream;
   determining that at least one macroblock of the incoming video stream maps to each of a plurality of macroblocks of the new video stream;
   determining a weighted mean rounded value for the macroblock type of the macroblocks of the original video stream that map to the particular macroblock; and
   assigning the weighted mean rounded value as the macroblock type of the particular macroblock.

24. A method as defined in claim 23, further comprising determining other flags associated with the particular macroblock.

25. A method as defined in claim 24, wherein the flags comprise a quant flag, a forward flag, a backward flag, and a pattern flag.

26. A method as defined in claim 20, wherein generating a new video stream comprises selecting motion vectors for each picture of the new video stream that requires motion vectors, wherein original motion vectors are included in the stream parameters of the original video stream.

27. A method as defined in claim 26, wherein selecting motion vectors further comprises:
   determining a weighted mean scaled value for motion vectors of macroblocks of the original video stream that map to a particular macroblock of the new video stream; and
   assigning the weighted mean scaled value to motion vectors of the particular macroblock.

28. A method as defined in claim 26, wherein selecting motion vectors further comprises:
   selecting candidate motion vectors for a particular macroblock of the new video stream, wherein the candidate motion vectors comprise scaled motion vectors from the original video stream and weighted mean scaled motion vectors; and
   determining a best motion vector from the candidate motion vectors, wherein the best motion vector provides a best fit to the data of the new video stream.

29. A method as defined in claim 26, further comprising performing fine grain motion estimation for the motion vectors.

30. A method as defined in claim 20, wherein generating the new video stream further comprises determining a DCT type flag for each macroblock using a weighted mean rounded procedure.

31. A method as defined in claim 20, wherein generating the new video stream further comprises determining a quantizer scale using one of:
   a weighted mean rounded procedure;
   a weighted max rounded procedure;
   a weighted min rounded procedure; and
   a weighted median rounded procedure.

32. A method as defined in claim 20, further comprising determining a coded block pattern for each macroblock.

33. In a system wherein an incoming video stream has a bit rate, a method for transcoding the incoming video to reduce the bit rate of the incoming video stream by using stream parameters of the incoming video stream, the method comprising:
   decoding the incoming video stream, which includes at least one B frame and a plurality of macroblocks, each macroblock having parameters that include at least a type flag indicating whether the macroblock is intra or non-intra and, for each non-intra macroblock, one or more motion vectors, and wherein stream parameters of the decoded video stream are used in generating a new video stream;
   spatially reducing a size of images of the incoming video stream horizontally and vertically by subsampling the incoming video stream, and such that the at least one B frame is considered during the spatially reducing;
   mapping each of the plurality of macroblocks to at least one macroblock in a new video stream;
   generating new motion vectors for each macroblock of the new video stream that requires motion vectors using motion vectors from the incoming video stream;
   determining a macroblock type for each macroblock of the new video stream, wherein the macroblock type is a weighted mean rounded value determined from macroblocks of the incoming video stream that map to a particular macroblock of the new video stream; and
   generating the new video stream using the new motion vectors, the new macroblock types, the stream parameters, and the reduced images, wherein at least one of the stream parameters corresponds to the at least one B frame, wherein some of the stream parameters from the incoming video stream that are included in the new video stream are unchanged in the new video stream, and wherein the spatially reduced images in the new video stream include at least one B frame.

34. A method as defined in claim 33, wherein generating new motion vectors for each macroblock of the new video stream that requires motion vectors further comprises determining a weighted mean scaled value from the macroblocks of the incoming video stream that map to a particular macroblock of the new video stream.

35. A method as defined in claim 33, wherein generating new motion vectors for each macroblock of the new video stream that requires motion vectors further comprises determining a motion vector that provides a best fit to the data of the new video stream from candidate vectors, wherein the candidate vectors comprise scaled motion vectors from the incoming video stream and a weighted mean scaled vector derived from the scaled motion vectors.

36. A method as defined in claim 35, further comprising performing fine grain motion estimation for the motion vectors.

37. A method as defined in claim 33, wherein generating the new video stream further comprises determining a DCT type flag, a quantizer scale, and a coded block pattern for the new video stream.

38. A method as defined in claim 33, further comprising at least one of:
   scaling f_codes of the original video stream as the f_codes are decoded; and
   scaling f_codes of the original video stream after decoding an entire picture of the original video stream.

39. A physical computer readable storage medium storing computer-executable instructions for implementing a method for transcoding an original video stream using stream parameters that are included in the original stream video stream such that the bit rate of the original video stream is reduced, the computer program product comprising:
   decoding the original video stream, which includes at least one B frame and a plurality of macroblocks, each macroblock having parameters that include at least a type flag indicating whether the macroblock is intra or non-intra and, for each non-intra macroblock, one or more motion vectors;
   re-sampling the decoded original video stream in order to spatially reduce a size of images of the original video stream horizontally and vertically by a factor, and such that the at least one B frame is considered during the re-sampling;
   mapping each of the plurality of macroblocks to at least one macroblock in a new video stream;
   determining new stream parameters for the new video stream, wherein the new stream parameters are determined from the stream parameters of the original video stream, wherein only some of the original stream parameters are re-computed, wherein some of the new stream parameters are unchanged, and wherein determining new stream parameters includes determining a macroblock type for each macroblock of the new video stream, wherein the macroblock type is determined by applying a weighted mean rounded value determined from the type flags of the macroblocks of the incoming video stream that map to a particular macroblock of the new video stream; and generating the new video stream that includes the spatially reduced images using the new stream parameters, wherein the spatially reduced images in the new video stream include at least one B frame.

40. A computer readable storage medium as defined in claim 39, wherein generating the new video stream comprises at least one of:

scaling f_codes of the original video stream as the f_codes are decoded; and scaling f_codes of the original video stream after decoding an entire picture of the original video stream.

41. A computer readable storage medium as defined in claim 39, wherein determining a macroblock type for each macroblock of the new video stream comprises:

determining a macroblock type for each macroblock of the original video stream that maps to a particular macroblock of the new video stream from the stream parameters of the original video stream;

determining that at least one macroblock of the incoming video stream maps to each of a plurality of macroblocks of the new video stream, such that the at least one macroblock only partially maps to any one macroblock of the new video stream and only contributes a partial value of its type flag to the weighted mean rounded value;

determining a weighted mean rounded value for the macroblocks of the original video stream that map to the particular macroblock; and assigning the weighted mean rounded value as the macroblock type of the particular macroblock.

42. A computer readable storage medium as defined in claim 39, further comprising determining other flags associated with the particular macroblock.

43. A computer readable storage medium as defined in claim 42, wherein the flags comprise a quant flag, a forward flag, a backward flag, and a pattern flag.

44. A computer readable storage medium as defined in claim 39, wherein generating a new video stream comprises selecting motion vectors for each picture of the new video stream that requires motion vectors, wherein original motion vectors are included in the stream parameters.

45. A computer readable storage medium as defined in claim 44, wherein selecting motion vectors further comprises:

determining a weighted mean scaled value for motion vectors of macroblocks of the original video stream that map to a particular macroblock of the new video stream; and assigning the weighted mean scaled value to motion vectors of the particular macroblock.

46. A computer readable storage medium as defined in claim 44, wherein selecting motion vectors further comprises:

selecting candidate motion vectors for a particular macroblock of the new video stream, wherein the candidate motion vectors comprise scaled motion vectors from the original video stream and weighted mean scaled motion vectors; and determining a best motion vector from the candidate motion vectors, wherein the best motion vector provides a best fit to the data of the new video stream.

47. A computer readable storage medium as defined in claim 44, further comprising performing fine grain motion estimation for the motion vectors.

48. A computer readable storage medium as defined in claim 44, wherein generating the new video stream further comprises determining a DCT type flag for each macroblock using a weighted mean rounded procedure.

49. A computer readable storage medium as defined in claim 48, wherein generating the new video stream further comprises determining a quantizer scale using one of:

a weighted mean rounded procedure;

a weighted max rounded procedure;

a weighted min rounded procedure; and a weighted median rounded procedure.

50. A computer readable storage medium as defined in claim 39, further comprising determining a coded block pattern for each macroblock.

51. In a system wherein an incoming video stream has a bit rate, a physical computer treadable storage medium having computer executable instructions for implementing a method for transcoding the incoming video to reduce the bit rate of the incoming video stream by using stream parameters of the incoming video stream, the computer program product comprising:

decoding the incoming video stream, which includes at least one B frame and a plurality of macroblocks, each macroblock having parameters that include at least a type flag indicating whether the macroblock is intra or non-intra and, for each non-intra macroblock, one or more motion vectors, wherein stream parameters of the decoded video stream are used in generating a new video stream;

spatially reducing a size of images of the incoming video stream horizontally and vertically by subsampling the incoming video stream, and such that the at least one B frame is considered during the spatially reducing;

mapping each of the plurality of macroblocks to at least one macroblock in a new video stream;

generating new motion vectors for each macroblock of the new video stream that requires motion vectors using motion vectors from the incoming video stream;

determining a macroblock type for each macroblock of the new video stream, wherein the macroblock type is a weighted mean rounded value determined from macroblocks of the incoming video stream that map to a particular macroblock of the new video stream; and generating the new video stream using the new motion vectors, the new macroblock types, and the reduced images, wherein other stream parameters from the incoming video stream are unchanged in the new video stream, wherein at least one of the other stream parameters corresponds to the at least one B frame, and wherein the spatially reduced images in the new video stream include at least one B frame.

52. A computer readable storage medium as defined in claim 51, wherein generating new motion vectors for each macroblock of the new video stream that requires motion vectors further comprises determining a weighted mean scaled value from the macroblocks of the incoming video stream that map to a particular macroblock of the new video stream.

53. A computer readable storage medium as defined in claim 51, wherein generating new motion vectors for each macroblock of the new video stream that requires motion vectors further comprises determining a motion vector that provides a best fit to the data of the new video stream from candidate vectors, wherein the candidate vectors comprise scaled motion vectors from the incoming video stream and a weighted mean scaled vector derived from the scaled motion vectors.

54. A computer readable storage medium as defined in claim 53, further comprising performing fine grain motion estimation for the motion vectors.

55. A computer readable storage medium as defined in claim 51, wherein generating the new video stream further comprises determining a DCT type flag, a quantizer scale, and a coded block pattern for the new video stream.

56. A computer readable storage medium as defined in claim 51, further comprising at least one of:
  scaling f_codes of the original video stream as the f_codes are decoded; and
  scaling f_codes of the original video stream after decoding an entire picture of the original video stream.

57. A spatial transcoder for transcoding an incoming video stream in order to reduce a bit rate of the incoming video stream, the spatial transcoder comprising:
  a stream decoder for decoding the incoming video stream, which includes at least one B frame and a plurality of macroblocks, and for extracting stream parameters from the incoming video stream, the stream parameters including, for each macroblock, at least a type flag indicating whether the macroblock is intra or non-intra and, for each non-intra macroblock, one or more motion vectors;
  a resampler for spatially reducing a size of images of the incoming video stream horizontally and vertically, and such that the at least one B frame is considered during the spatially reducing, the resampler being further configured to map each of the plurality of macroblocks to at least one macroblock in a new video stream and determine a macroblock type for each macroblock of the new video stream, wherein the macroblock type is determined by applying a weighted mean rounded value determined from the type flags of the macroblocks of the incoming video stream that map to a particular macroblock of the new video stream; and
  a stream generator for generating an output video stream that has a lower bit rate and a smaller image size than the incoming video stream, wherein the stream generator uses the stream parameters to generate new stream parameters for the output video stream using the original stream parameters and including at least one parameter corresponding to the at least one B frame, and wherein the output video stream includes at least one B frame.

58. A spatial transcoder as defined in claim 57, wherein the stream parameters further comprise one or more of:
  f_codes; motion type, motion vertical field select; forward prediction type; backward prediction type; DCT type; quantizer scale; coded block pattern; and DCT coefficients.

\* \* \* \* \*